C. P. EBERSOLE.
CONTROLLER REGULATOR.
APPLICATION FILED APR. 29, 1905.
906,620.
Patented Dec. 15, 1908.
3 SHEETS—SHEET 1.
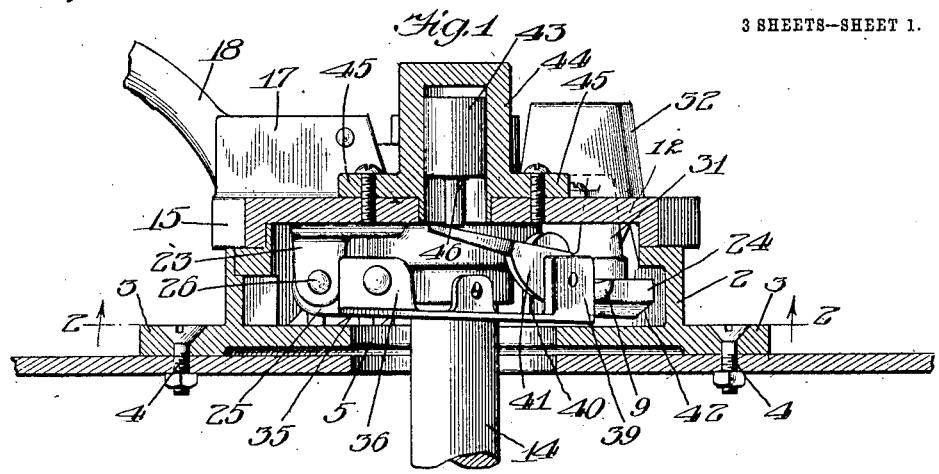
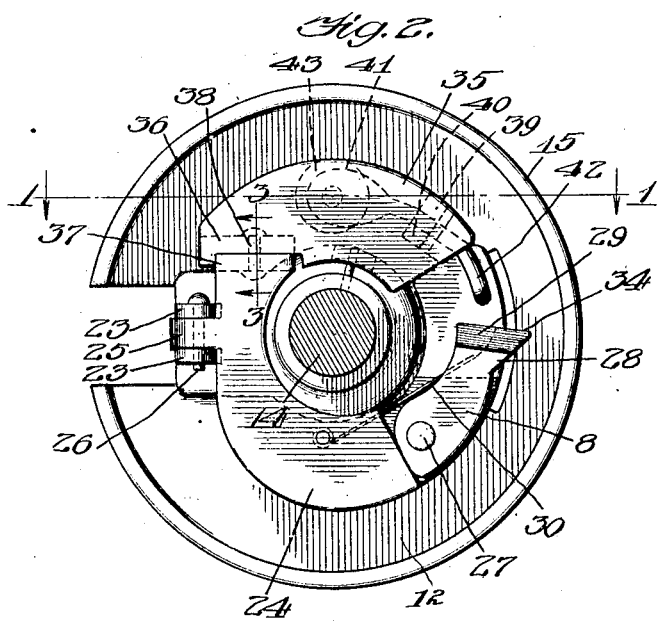
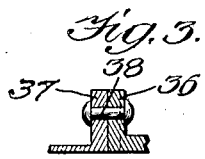
Witnesses:
Robert H. Weir
W. Perry Hahn
Inventor:
Cyrus P. Ebersole
By Jones & Addington
Attorneys

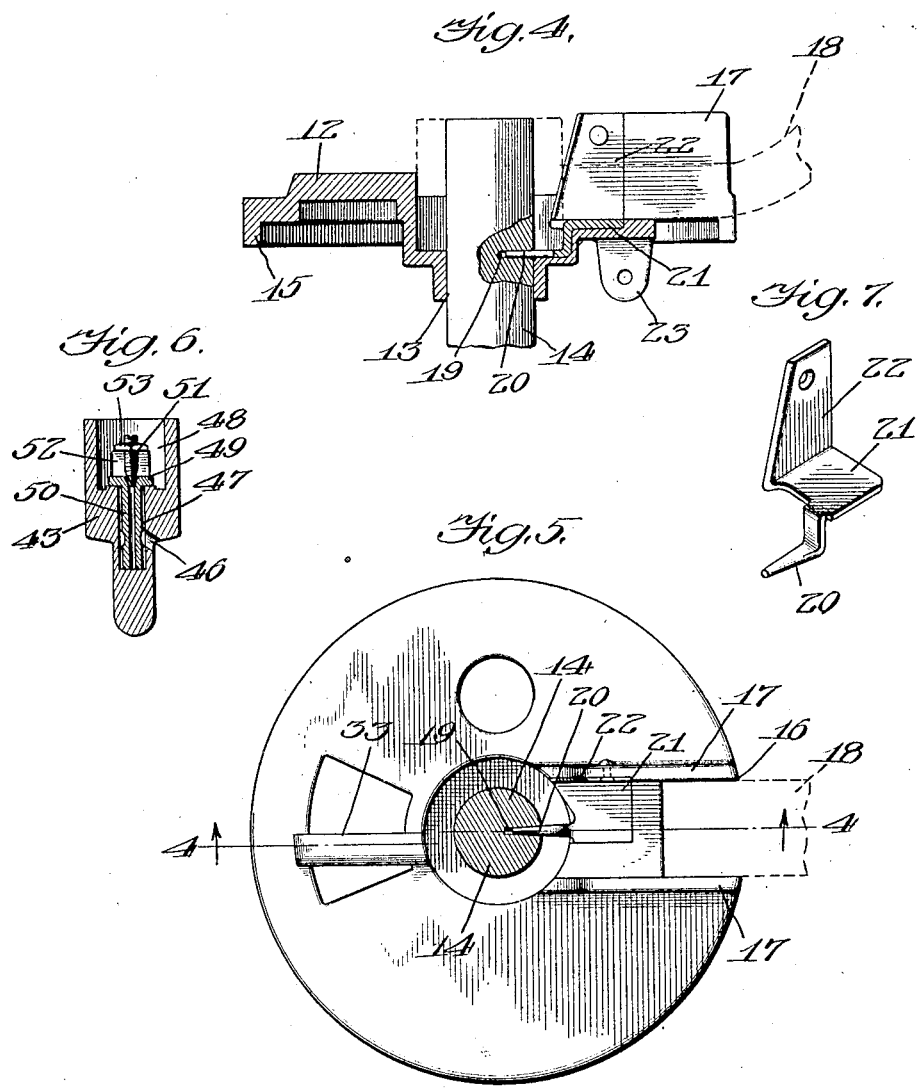

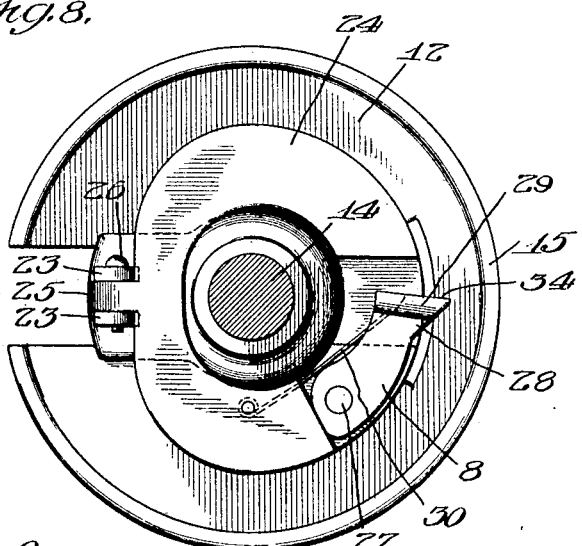
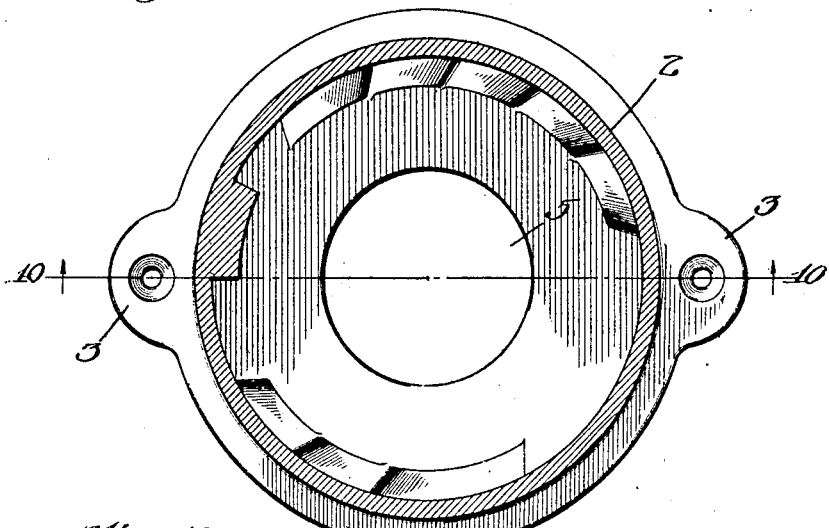
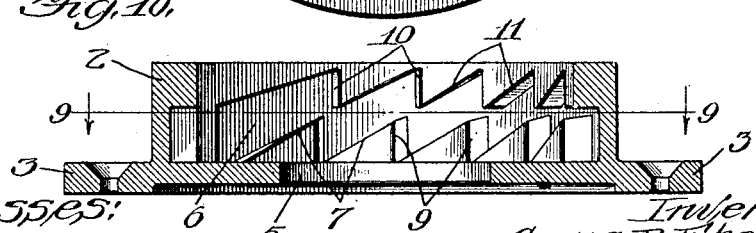

UNITED STATES PATENT OFFICE.

CYRUS P. EBERSOLE, OF KEOKUK, IOWA, ASSIGNOR, BY MESNE ASSIGNMENTS, TO AMERICAN AUTOMOTONEER COMPANY, OF PHILADELPHIA, PENNSYLVANIA, A CORPORATION OF PENNSYLVANIA.

CONTROLLER-REGULATOR.

No. 906,620.  Specification of Letters Patent.  Patented Dec. 15, 1908.

Application filed April 29, 1905. Serial No. 258,099.

*To all whom it may concern:*

Be it known that I, CYRUS P. EBERSOLE, citizen of the United States, residing at Keokuk, in the county of Lee and State of Iowa, have invented a certain new and useful Improvement in Controller-Regulators, of which the following is a full, clear, concise, and exact description, reference being had to the accompanying drawing, forming a part of this specification.

My invention relates to improvements in controller regulators, such as are particularly adapted for use in connection with street car controllers, or in analogous relations for preventing the motorman or operator from operating the controller to cut out the resistance in the motor circuit too rapidly and thereby permit an abnormal flow of current through the motor at starting.

In accordance with the preferred embodiment of my invention, I provide a casing adapted to be mounted upon the controller box having formed therein a circular zig-zag slot or groove, together with a suitably governed movably mounted dog or cam adapted to work in said slot to regulate the speed of operation of the controller.

In the accompanying drawings illustrating the preferred embodiment of my invention, Figure 1 is a sectional view of my device taken on the line 1—1 of Fig. 2; Fig. 2 is a bottom view taken on the line 2—2 of Fig. 1; Fig. 3 is a detail section on the line 3—3 of Fig. 2; Fig. 4 is a sectional view of the rotatable cover or cap taken on the line 4—4 of Fig. 5, and showing my improved means for securing the same to the controller shaft; Fig. 5 is a plan view of the cover or cap with the dash pot cylinder removed; Fig. 6 is a sectional view of the dash pot piston; Fig. 7 is a perspective view of my means for securing the rotatable cover to the controller shaft; Fig. 8 is a bottom view of a modified form of rotatable cover; Fig. 9 is a sectional view of the casing taken on the line 9—9 of Fig. 10; Fig. 10 is a sectional view of the casing taken on the line 10—10 of Fig. 9.

In the construction which I have worked out as being a practical embodiment of my invention, upon the top of the usual casing of the street car controller is mounted a cylindrical casing or casting 2 having projecting lugs 3 through which bolts or screws 4 may be passed to secure the same to the top of the controller casing. An opening 5 is formed in the bottom of the casing to permit the passage of the controller shaft.

The inner periphery of the casing 2 is provided with a zig-zag slot or channel 6, having preferably the form shown in Figs. 9 and 10, in which the portions 7, of the lower edge of the slot form inclined cam surfaces up which the dog 8 slides as the same is rotated with the controller shaft, said cam portions being connected by the substantially vertical portions 9. The upper edge of the zig-zag slot has the stop or ratchet portions 10 against which the dog 8 strikes when rotated with the controller shaft, said portions being connected by the inclined parts 11 which limit the upward movement of the dog and confine it within the groove 6. As shown in Fig. 9, these cam and stop surfaces occur at short intervals throughout portions of the periphery and at longer intervals at others, so that the proper movement of the controller may take place. Any arrangement, however, of these stops and inclined surfaces may be made so that the desired operation of the controller may be secured.

Mounted to form a rotatable cover for the cylindrical casing 2 is a casting 12 having a central opening 13 through which the controller shaft 14 is adapted to pass and a downwardly extending annular flange 15 which is adapted to fit over the side walls of the casing 2 and prevent displacement of the cover. This cover is provided with a radial groove 16 having the side walls 17 thereof extending upwardly beyond the cover to form upstanding lugs serving as abutments against which the handle reacts. These lugs fit on either side of the handle 18 of the controller. The handle or operating lever is arranged to engage the socket intermediate its grip portion and hub. By this arrangement the cover 12 and handle are connected and as the handle is moved to rotate the controller the cover is rotated therewith.

In order to prevent the removal of the cover 12 by unauthorized parties, a transverse opening 19 is formed in the shaft 14 into which is adapted to fit a pin 20 integrally formed upon an L-shaped clip 21, which fits in the groove or channel 16 and has the side 22 thereof riveted to one of the side walls 17.

Depending from the underside of the rotatable top 12 are a pair of lugs 23 between which is pivoted one end of a semi-circular arm 24, a lug 25 being formed on said arm which is adapted to fit between the lugs 23 and be secured in position by a pin or bolt 26 passing therethrough, whereby a hinged or pivoted joint is made on the arm at its rear end. The forward end of the arm 24 carries the dog 8 which is pivoted thereto at 27 and is provided at its opposite end with a projection 28 which is adapted to fit within the zig-zag channel 6 of the casing 2. The underside of the dog 8 is preferably chamfered as at 29 in order that the same may readily ride up the inclined cams 7. A spring 30 having one end secured to the arm 23 and its opposite free end engaging the outer end of the dog serves to maintain the dog in its outermost position and the end thereof in the channel 6. An upwardly extending lug 31 is carried by the arm, and this portion projects up within a housing or casing 32 upon the cover and bears against a cross-piece, to prevent twisting of the arm when the dog 8 engages the stops 10. By thus mounting the dog upon an arm or support which has a vertical movement at its outer end, as the cover is rotated with the controller shaft, the dog follows in the channel 6 and engages on its under side the inclined cam portions 7 and riding up the same, and if the movement of the handle is rapid engaging at its forward end 34, the steps 10 preventing a further movement of the controller handle until it has dropped from beneath the stop. The stop portions 10 are placed far enough back of the vertical portions 9 to permit the dog to readily drop when pressure is relieved upon the handle of the controller. It will thus be noted that the arm 24 forms a coupling by which the dog may be connected with the handle of the controller, and whereby the dog may be oscillated in the zig-zig slot permitting the cam surfaces to move the dog into engagement with the stop surfaces, and permitting the dog by gravity to move out of engagement with the stop surfaces. It will also be noted that by pivoting the dog upon the coupling member, a dog jointed to move in two directions is provided, whereby the dog may be oscillated into and out of engagement with the stops, and when the controller is moved in a reverse direction will have a movement to permit it to ride over the cam surfaces, permitting a continuous movement in the reverse direction of the controller. By pivoting the arm 24 the arm has an oscillating movement as distinguished from a sliding movement.

In order that the action of the dog in its vertical movement may be properly governed, a second arm 35 is pivoted to the arm 24, a lug 36 being formed on the arm and a corresponding lug 37 being formed on the arm 24 through which a pin 38 is passed to pivot the two arms together. The arm 35 is provided at the end opposite its pivot with a pair of upturned lugs 39 and 40 between which is pivoted a lever 41 one end 42 of which is adapted to engage under the free end of the arm 24. The opposite end of the lever 41 is adapted to engage under the piston 43 of the cylinder 44. The cylinder 44 is preferably formed of a separate casting placed upon the outside of the top or cover, and provided with lugs 45, through which suitable screws are passed to secure the same to the cover. The piston 43 is provided with a port 46, communicating by the opening 47 with a hollow chamber 48 formed in the piston. In order that the speed with which the piston will move upward in its cylinder may be governed, a valve 49 is provided in the opening which as the piston moves upward tends to prevent the escape of air through the port 46, but as the piston moves downwardly rises and readily permits the escape of air through the port 46. The valve 49 is provided with a stem 50 extending into the opening 47 which has a central opening, the outer end of which is closed by the plug 51 and is adapted to screw into a head 52 of the valve and be maintained in position by a set nut 53. By opening or closing this central port, the movement of the piston in its cylinder will be increased or decreased as desired. By this arrangement of a dash pot, it will be seen that while the piston may readily descend in its cylinder when the arm 24 is raised, the upper movement of the piston will be retarded thereby preventing a rapid downward movement of the arm and the dog 8.

In my Fig. 8 I have illustrated a modification of my device wherein the dash pot has been left off and the regulating feature dispensed with. In this arrangement the arm 24 carrying the dog is made substantially circular in form while the controlling arm is left off. In other respects, however, the device is similar to my other construction.

The operation of the device will be readily understood. As the controller handle is moved around, the dog will ride up the inclines 7 and if the handle is moved too rapidly, strike the vertical portions 11 of the slot, thereby causing the handle to stop until the dog has been permitted to drop down out of engagement therewith. The movement of the dog in dropping down will be retarded by the piston 42 and an intermittent movement of the controller given in one direction. The controller may be moved in a reverse direction without hindrance as the dog, due to its pivotal mounting upon the arm 24 will merely ride over the top of the cams and stops.

Having thus described my invention what I claim as new and desire to secure by Letters Patent is:

1. In a controller regulator, the combination with a member movable longitudinally of the shaft of the controller, of a stop for engaging said member, and means for moving said member into engagement with said stop, said member being disengaged from said stop by gravity.

2. In a controller regulator, the combination with a member movable longitudinally of the shaft of the controller, of a stop for engaging said member, and a cam for moving said member into engagement with said stop, said member being disengaged from said stop by gravity.

3. In a controller regulator, the combination with a handle, of a locking member, means for moving said locking member longitudinally of the shaft of the controller and into a locked position upon the forward movement of said handle, said locking means being moved into an unlocked position by gravity.

4. The combination with a controller operating means, of a pivoted arm mounted to rotate with said shaft, a dog mounted upon said arm, a stationary annular part having a peripheral slot provided with cam portions and with stop portions with which said dog is adapted to engage, and means to retard the movement of said arm in a direction reverse to that imparted by the cam portions, whereby when the stops are engaged by the dog the movement of the controller is arrested for an appreciable time.

5. The combination with a controller operating means, of a pivoted arm associated with said means and rotatable therewith, a dog mounted upon said arm, a stationary annular part having a peripheral slot provided with cam portions and with stop portions with which the said dog is adapted to engage, and a dash pot to retard the movement of said arm in a direction opposite that in which it is moved by said cam portions.

6. The combination with a controller operating means, of a vertically movable member associated with said means and rotatable therewith, a dog mounted upon said member, a stationary annular part having a peripheral slot provided with inclined steps in its lower edge and with stops in its upper edge, said dog being adapted to project into said slot and ride up said steps as said means is rotated, and engage said stops whereby said vertically movable member is lifted when the dog is raised by said inclined portion, and a dash pot to prevent said member from immediately dropping beneath said stops to the next inclined portions, whereby an intermittent movement of the controller is caused.

7. The combination with a controller operating means, of a vertically movable member associated with said means and rotatable therewith, a dog mounted upon said member, a stationary annular part having a peripheral slot provided with inclined steps in its lower edge, and with stops in its upper edge in proximity to the inclined steps, said dog being adapted to project into said slot and ride up said steps as said means is rotated and engage said stops, whereby said vertically movable member is lifted by said inclined portions, and a dash pot to prevent said member immediately dropping beneath said stops to the next inclined portions, whereby an intermittent movement of the controller is caused in one direction, said dog being yieldingly pressed into said slot and being so formed that the controller may be readily rotated in a reverse direction without hindrance.

8. The combination with a stationary annular part provided with a series of stops and a series ofcams, of a cover for said part rotatable with the controller, a vertically movable arm pivoted to said cover, a dog mounted upon said arm and adapted to coöperate with said stops and with said cams to permit an intermittent movement only of the controller in one direction, but a continuous movement of the controller in a reverse direction.

9. The combination with a stationary annular part provided with a series of stops and a series of cams, of a cover for said part, means for connecting the cover with the controller shaft, a vertically movable arm carried by said cover, a dog carried by said arm and adapted to coöperate with said stops and with said cams, to permit an intermittent movement of the controller in one direction and a continuous movement thereof in a reverse direction.

10. The combination with a stationary annular part provided with a series of stops, and a series of cams, of a cover for said part, a projection on said cover adapted to enter an opening in the controller shaft for connecting said cover with the shaft, and a vertically movable arm carried by said cover, a dog carried by said arm and adapted to coöperate with said stops and with said cams to permit an intermittent movement of the controller in one direction and a continuous movement thereof in the reverse direction.

11. The combination with a controller operating means, of a dog associated with said means, and rotatable therewith, a series of cams and a series of stops with which said dog is adapted to coöperate to permit an intermittent movement of the controller in one direction and a continuous movement of the controller in a reverse direction, and means for governing the action of said dog.

12. In a controller, in combination with the controller shaft, a hood on said shaft, a handle, and provision whereby the handle in operative position is detachably engaged with the hood.

13. In a controller, in combination with a controller shaft, a hood fixed to said shaft, said hood having a socket, and a handle engaging the socket of said hood.

14. In a controller, in combination with a controller shaft, a hood having lugs thereon fixed to said shaft, and a handle fitting between said lugs.

15. In a controller regulator, in combination with a controller shaft, of a rotatable member, automatic means for controlling the speed of the said member, and a handle having its hub coaxial with the controller shaft and engaging the said member.

16. In a controller, in combination with a controller shaft, a hood fixed to the shaft, and a detachable handle having its hub coaxial with the shaft and engaging the hood to move the same.

17. In a controller regulator, in combination with a controller shaft, a hood fixed to the shaft and having a dog mounted thereon, a series of cams and stops with which the dog coöperates, lugs on the hood, and a handle adapted when in engagement with the shaft to fit between the lugs.

18. In a controller regulator, in combination with a controller shaft, a hood, means for intermittently arresting the hood during movement thereof in one direction without interfering with its continuous movement in the opposite direction, lugs on the hood, and a handle adapted when in engagement with the shaft to fit between the lugs.

19. In a controller regulator, in combination, a hood, and a controller shaft-handle, one of said parts being provided with a projecting portion for engagement with the other to operatively connect the handle and hood for simultaneous movement and automatic means to regulate the movement of the hood.

20. In a controller, in combination, a series of stationary cams and stops arranged about the controller shaft, a rotatable hood concentric with the said shaft and having a dog which coöperates with the cams and stops to automatically control the speed of the hood in a forward direction, a handle, and means on the hood with which the handle engages to connect the hood and handle for simultaneous movement in both directions.

21. In a controller, in combination, a series of stationary cams and stops arranged about the controller shaft, a rotatable hood concentric with the said shaft and having a dog which coöperates with the cams and stops to control the speed of the hood in a forward direction without interfering with the backward movement thereof, upwardly extending lugs on the hood, and a handle which when on the shaft seats between the lugs to connect the hood and handle for simultaneous movement in both directions.

22. A controller regulator having a rotating hood provided with a stationary abutment, a detachable controller handle which reacts against the abutment to compel simultaneous movement of the said member and handle, and means for automatically intermittently arresting the said member in one direction.

23. A controller regulator having a rotating member provided with a pair of lugs between which the controller handle fits to compel simultaneous movement of the said member and handle in both directions, and means for automatically intermittently arresting the said member in one direction.

24. In a controller regulator, a rotatable member, automatic means to control the movement thereof, and a detachable handle which when in operative position engages said member for simultaneous movement therewith.

25. In a controller regulator, a series of cams and stops, a hood having a pair of upstanding lugs, a dog on the hood coöperating with the cams and stops, and a detachable handle which when attached in position on the controller shaft, seats between the lugs to operatively connect the handle and hood for simultaneous movement in both directions.

26. In combination with a controller having a detachable handle, a speed regulating member having an abutment with which the handle is adapted to coöperate, said abutment being of such dimensions that the handle cannot be engaged with the controller shaft without being brought into operative relation to the abutment.

27. In a controller, in combination, a zigzag way, a hood over the same and having a dog which coöperates with the way to regulate the forward movement of the hood in one direction without interfering with its movement in the opposite direction, a detachable handle for the controller shaft, and lugs on the hood of such height that the handle cannot be engaged with the shaft without entering between the lugs.

28. In a controller regulator, in combination with a controller shaft, a hood fixed on said shaft, and a handle having its hub coaxial with the shaft and detachably engaging the hood and shaft.

29. In a controller regulator, in combination with a controller shaft, a hood fixed to said shaft and an operating lever arranged to engage with the hood intermediate the grip portion and hub of said lever.

30. In a controller, a hood, speed regulating means therefor, and a handle which when in operative position has connection with the hood at a point between the grip portion and hub of said handle.

31. In a controller regulator, in combination with a controller shaft, a hood on the shaft, a handle for the controller, a connection between the hood and handle intermediate the grip portion and hub of the handle, and means for regulating the speed of rotation of the handle in one direction.

32. In a controller regulator, a hood on the controller shaft, means for intermittently arresting the hood, and a detachable controller handle which is detachably connected to the hood.

In witness whereof, I have hereunto subscribed my name in the presence of two witnesses.

CYRUS P. EBERSOLE.

Witnesses:
CLARA MILLER,
C. A. LOEFFLER.